United States Patent
Tozu et al.

[11] Patent Number: 6,106,080
[45] Date of Patent: Aug. 22, 2000

[54] BRAKE CONTROL SYSTEM FOR A VEHICLE

[75] Inventors: Kenji Tozu, Yokkaichi; Takayuki Itoh, Nagoya; Norio Yamazaki, Kariya; Satoshi Yokoyama, Anjo, all of Japan

[73] Assignee: Aisin Seiki Kabushiki Kaisha, Kariya, Japan

[21] Appl. No.: 09/139,408

[22] Filed: Aug. 25, 1998

[30] Foreign Application Priority Data

Aug. 26, 1997 [JP] Japan .................................. 9-244591

[51] Int. Cl.⁷ ........................................ B60T 8/32
[52] U.S. Cl. ...................... 303/116.1; 303/140; 303/146; 303/113.2; 303/10
[58] Field of Search ............................. 303/116.1, 116.4, 303/113.2, DIG. 3, DIG. 4, 10–12, 116.2, 140, 146, 147, 148, 122.12, 122.13, 119.1

[56] References Cited

U.S. PATENT DOCUMENTS 4,898,431  2/1990  Karnopp et al. .
5,540,488  7/1996  Terazawa et al. .................... 303/116.1

FOREIGN PATENT DOCUMENTS 64-74153  3/1989  Japan .
5-116609  5/1993  Japan .
8-230634  9/1996  Japan .
9-109861  4/1997  Japan .

*Primary Examiner*—Douglas C. Butler
*Attorney, Agent, or Firm*—Burns, Doane, Swecker & Mathis, LLP

[57] ABSTRACT

The present invention is directed to a brake control system for a vehicle, which includes a master cylinder for pressurizing the brake fluid to discharge a master cylinder pressure in response to depression of a brake pedal, a modulator disposed between the master cylinder and a wheel brake cylinder for selecting a pressure control mode out of rapid pressure increase, pulse pressure increase, pulse pressure decrease, rapid pressure decrease and hold modes, a hydraulic pressure pump for discharging the pressurized brake fluid to the wheel brake cylinder through the modulator, and a reservoir for storing the brake fluid drained from the wheel brake cylinder through the modulator. A normally open first switching valve is disposed between the master cylinder and the modulator, and a normally closed second switching valve is disposed between the master cylinder and an inlet of the pressure pump. The first switching valve is placed in its closed position when the braking pressure in the wheel brake cylinder is to be pressurized automatically, while the second switching valve is actuated to communicate the master cylinder with the pressure pump only when the braking pressure in the wheel brake cylinder is being increased by the modulator.

9 Claims, 11 Drawing Sheets

BRAKE CONTROL SYSTEM FOR A VEHICLE

This application claims priority under 35 U.S.C. Sec. 119 to No. 9-244591 filed in Japan on Aug. 26, 1997, the entire content of which is herein incorporated by reference.

BACKGROUND OF THE INVENTION

1. Field of the Invention

The present invention relates to a brake control system for a vehicle, which performs various controls including a steering control by braking to restrain an excessive oversteer and excessive understeer which will occur during, for example, cornering, by applying a braking force to each wheel of the vehicle irrespective of depression of a brake pedal. More particularly, the present invention relates to the brake control system having a hydraulic pressure control apparatus for discharging brake fluid of a master cylinder by a hydraulic pressure pump through a modulator, and storing the brake fluid drained from a wheel brake cylinder through the modulator, in a reservoir.

2. Description of the Related Arts

Recently, in order to control a vehicle motion characteristic, especially to control a turning characteristic, it has been proposed to control directly a turning moment by controlling braking force applied to left and right wheels differently. In the U.S. Pat. No. 4,898,431, for example, an apparatus for controlling vehicle motion through the use of a brake controlling system which compensates for the influence of lateral forces on the vehicle has been proposed. The apparatus is constituted so as to control the braking force applied to the vehicle by the braking force control system in response to a comparison of a desired yaw rate with an actual yaw rate, thereby to improve the vehicle stability during the course of vehicle motion such as cornering. Consequently, a braking force is applied to each wheel irrespective of depression of a brake pedal, so that a so-called steering control by braking is performed to provide an oversteer restraining control and understeer restraining control.

Also, there is known a traction control system (TRC), by which the braking force is applied to a driven wheel, when an acceleration slip occurs while the brake pedal is not depressed. For example, a Japanese Patent Laid-open Publication No. 64-74153 discloses a hydraulic pressure control apparatus for use in the traction control system. In FIG. 3 of this publication, there is disclosed an example of the apparatus, in which a single TRC changeover valve is connected to an ABS circuit of a hold circuit. A Japanese Patent Laid-open Publication No. 5-116609 discloses a hydraulic pressure control apparatus for use in a vehicle with all wheels driven, which includes two brake circuits, an ABS for providing an individual control for wheels by means of ABS valves, a pump of a self-supply type disposed in each brake circuit for returning the brake fluid drained when the control is performed, and a brake ASR using a return pump for applying the braking pressure in case of the ASR. In this publication, it was aimed to perform the braking operation, even when the ASR is being performed. With respect to an embodiment disclosed in FIG. 1 of the publication, it is described that a changeover valve 3 and a load valve 14 are provided for the ASR, and that the load valve 14 is disposed in a connecting passage between a primary brake cylinder (in 6) and an inlet of a pump, and that a check valve separates this passage from a storage chamber 9. It is also described that when one of two wheels tends to slip, valves 3 and 14 are changed over and a pump 10 starts to be driven, simultaneously.

The hydraulic pressure control apparatus disclosed in FIG. 3 of the Japanese Patent Laid-open Publication No. 64-74153 relates to the one which controls the ABS circuit when the brake pedal is not depressed. If that apparatus was so constituted to enable the ABS circuit to be controlled when the brake pedal is depressed, the steering control by braking could be performed, thereby to enable the vehicle motion control to be performed. However, in the case where the steering control by braking for the vehicle is performed by the hydraulic pressure control apparatus as disclosed in FIG. 3 of that publication, for example, the brake fluid stored in the reservoir can not be drained, due to pressure increase which will occur when the brake pedal is depressed, thereby to fulfill the reservoir. As a result, it may be difficult to perform a desired pressure decreasing operation when the ABS (anti-skid control) starts.

According to the above-described publication No. 5-116609, as for the changeover valve 3 and load valve 14, a pair of two-port two-position solenoid operated switching valves are provided, and adapted to be changed over simultaneously. Therefore, in view of the embodiment as disclosed in FIG. 1 of that publication, there may be a case where the brake fluid in the reservoir can not be drained, thereby to fulfill the reservoir. In this case, however, no means for draining the fluid appropriately has been provided.

In addition, recently proposed is a brake-assist control, which compensate for lack of depressing force applied by a vehicle driver in case of an emergency braking operation. The brake-assist control is made by pressurizing the brake fluid automatically in response to braking conditions such as a brake pedal speed, thereby to apply the desired braking force. According to this apparatus, if the apparatus includes the hydraulic pressure pump and reservoir, and is adapted to suck the brake fluid in the reservoir or the master cylinder, then the same problem will occur as described above. Although it is possible to provide a sensor for detecting the brake fluid stored in the reservoir, and determine whether the brake fluid in excess of a predetermined volume remains in the reservoir, through the sensor. However, this sensor is very expensive, so that it is preferable to avoid using this sensor, while wheel speed sensors are needed for all of the controls to be performed.

SUMMARY OF THE INVENTION

Accordingly, it is an object of the present invention to provide a brake control system for a vehicle having a hydraulic pressure control apparatus for discharging the brake fluid of a master cylinder by a hydraulic pressure pump through a modulator, and storing the brake fluid drained from a wheel brake cylinder in a reservoir through the modulator, wherein the brake fluid stored in the reservoir can be drained by the hydraulic pressure pump properly, thereby to perform an appropriate pressure control.

In accomplishing the above and other objects, a brake control apparatus for a vehicle includes a wheel brake cylinder which is operatively mounted on each wheel of the vehicle, a master cylinder for pressurizing brake fluid to supply braking pressure to the wheel brake cylinder in response to depression of a brake pedal, a modulator which is disposed between the master cylinder and the wheel brake cylinder to modulate the braking pressure in the wheel brake cylinder, a pressure pump for introducing from an inlet thereof the brake fluid and pressurizing the brake fluid to supply the braking pressure to the wheel brake cylinder through the modulator, and a reservoir for storing the brake fluid drained from the wheel brake cylinder through the modulator. A first switching valve is provided for communicating the master cylinder with the modulator, or blocking the communication between the master cylinder and the modulator. The first switching valve normally communicates the master cylinder with the modulator. A second switching valve is provided for communicating the master cylinder with the inlet of the pressure pump, or blocking the communication between the master cylinder and the pressure pump. The second switching valve normally blocks the communication between the master cylinder and the pressure pump. A check valve is disposed between a first position for connecting the modulator with the reservoir and a second position for connecting the second switching valve with the inlet of the pressure pump. The check valve is adapted to allow the brake fluid toward the pressure pump and prevent the reverse flow. A controller is provided for controlling the modulator, the pressure pump, the first switching valve and the second switching valve. The controller is adapted to actuate the pressure pump to be driven continuously when the controller is controlling the modulator, and adapted to actuate the second switching valve to communicate the master cylinder with the pressure pump only when the braking pressure in the wheel brake cylinder is being increased by the modulator.

The brake control system may further include a vehicle condition monitor for monitoring a condition of the vehicle. And, the controller may be adapted to actuate the modulator to modulate the braking pressure in at least one of the wheel brake cylinders operatively mounted on one of the wheels to control the braking force applied thereto, on the basis of the output of the monitor and irrespective of depression of the brake pedal, and may be adapted to actuate the second switching valve to communicate the master cylinder with the pressure pump, when the controller actuates the modulator to modulate the braking pressure on the basis of the output of the monitor and irrespective of depression of the brake pedal, and only when the braking pressure in the wheel brake cylinder is being increased by the modulator.

The brake control system may further include a relief valve which is adapted to allow the brake fluid to flow from the modulator to the master cylinder when the braking pressure in the downstream of the first switching valve is more than the braking pressure discharged from the master cylinder by a predetermined pressure difference.

Preferably, the controller is adapted to actuate the second switching valve to communicate the master cylinder with the pressure pump prior to the time when the pulse pressure increase mode is selected for the pressure control mode, by a predetermined period of time.

The controller may be adapted to keep the second switching valve blocking the communication between the master cylinder and the pressure pump until an estimated volume of the brake fluid stored in the reservoir is less than a predetermined volume, when the pulse pressure increase mode is selected for the pressure control mode.

Furthermore, the controller may be adapted to keep the second switching valve blocking the communication between the master cylinder and the pressure pump, when the duration of the pulse pressure decrease mode is less than a predetermined period of time until the pulse pressure decrease mode is changed to the pulse pressure increase mode.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
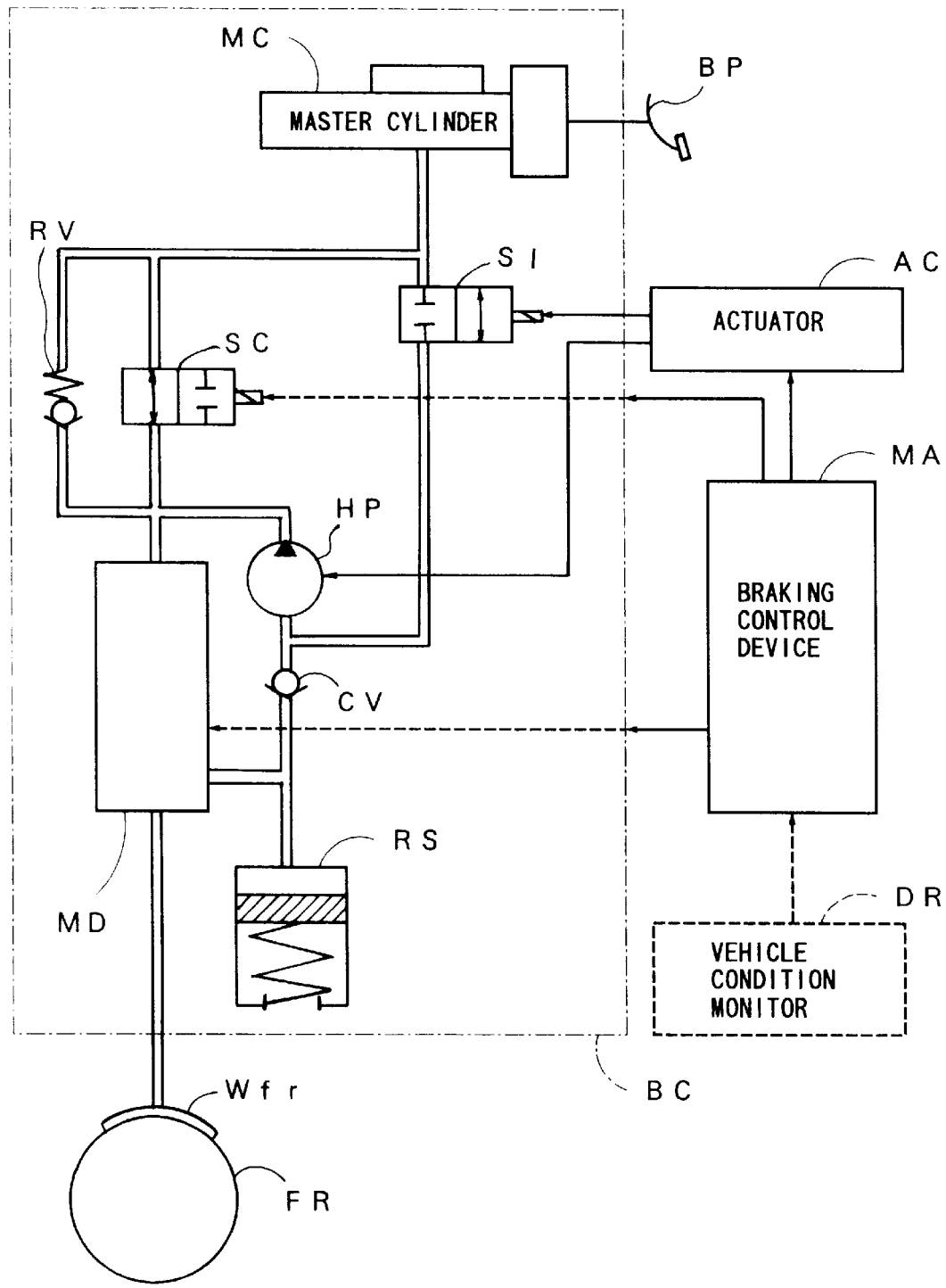
FIG. 1 is a general block diagram illustrating a brake control system according to an embodiment of the present invention.

Referring to FIG. 1, there is schematically illustrated a brake control system according to the present invention, which includes a hydraulic braking pressure control apparatus BC for controlling a braking force applied to each of front and rear wheels FL, FR, RL, RR of the vehicle, at least in response to depression of a brake pedal BP, a vehicle condition monitor DR for monitoring a condition of the vehicle in motion, and a braking control device MA for controlling the braking pressure control apparatus BC on the basis of the result of the vehicle condition monitor DR, irrespective of depression of the brake pedal BP, thereby to control the braking force applied to at least one of the wheels.

The braking pressure control apparatus BC includes a wheel brake cylinder Wfr operatively mounted on each wheel for applying the braking force thereto, a master cylinder MC for pressurizing the brake fluid to discharge a master cylinder pressure in response to depression of the brake pedal BP, a modulator MD disposed between the master cylinder MC and the wheel brake cylinder Wfr for selecting a pressure control mode out of rapid pressure increase, pulse pressure increase, pulse pressure decrease, rapid pressure decrease and hold modes in response to outputs of the braking control device MA, thereby to modulate the braking pressure in the wheel brake cylinder Wfr, a hydraulic pressure pump HP for discharging the pressurized brake fluid to the wheel brake cylinder Wfr through the modulator MD, a reservoir RS for storing the brake fluid drained from the wheel brake cylinder Wfr through the modulator MD, a normally open first switching valve SC for opening or closing a passage for communicating the master cylinder MC with the modulator MD, and a normally closed second switching valve SI for opening or closing a passage for communicating the master cylinder MC with an inlet of the pressure pump HP.

In parallel with the first switching valve SC, a relief valve RV is disposed to prevent the brake fluid in the master cylinder MC from flowing toward the modulator MD, and allow the brake fluid to flow toward the master cylinder MC when the braking pressure at the modulator MD is more than the braking pressure at the master cylinder MC by a predetermined pressure difference. And, a check valve CV is disposed between a position for connecting the modulator MD with the reservoir RS and a position for connecting the second switching valve SI with the inlet of the pressure pump HP, to allow the brake fluid to flow toward the pressure pump HP and prevent its reverse flow. Furthermore, an actuator AC is provided for actuating the pressure pump HP continuously when the braking control device MA controls the modulator MD, and actuating the second switching valve SI to communicate the master cylinder MC with the pressure pump HP only when the braking pressure in the wheel brake cylinder Wfr is being increased by the modulator MD in response to the outputs of the braking control device MA. In other words, when one of the pulse pressure decrease mode, rapid pressure decrease mode and hold modes other than the rapid pressure increase mode and pulse pressure increase mode is selected, the second switching valve SI is placed in its closed position, so that the brake fluid stored in the reservoir RS shall be returned by the continuously driven pressure pump HP to the master cylinder MC through the first switching valve SC placed in its open position, or through the relief valve RV (when the first switching valve SC is placed in its closed position).

Figure 2:
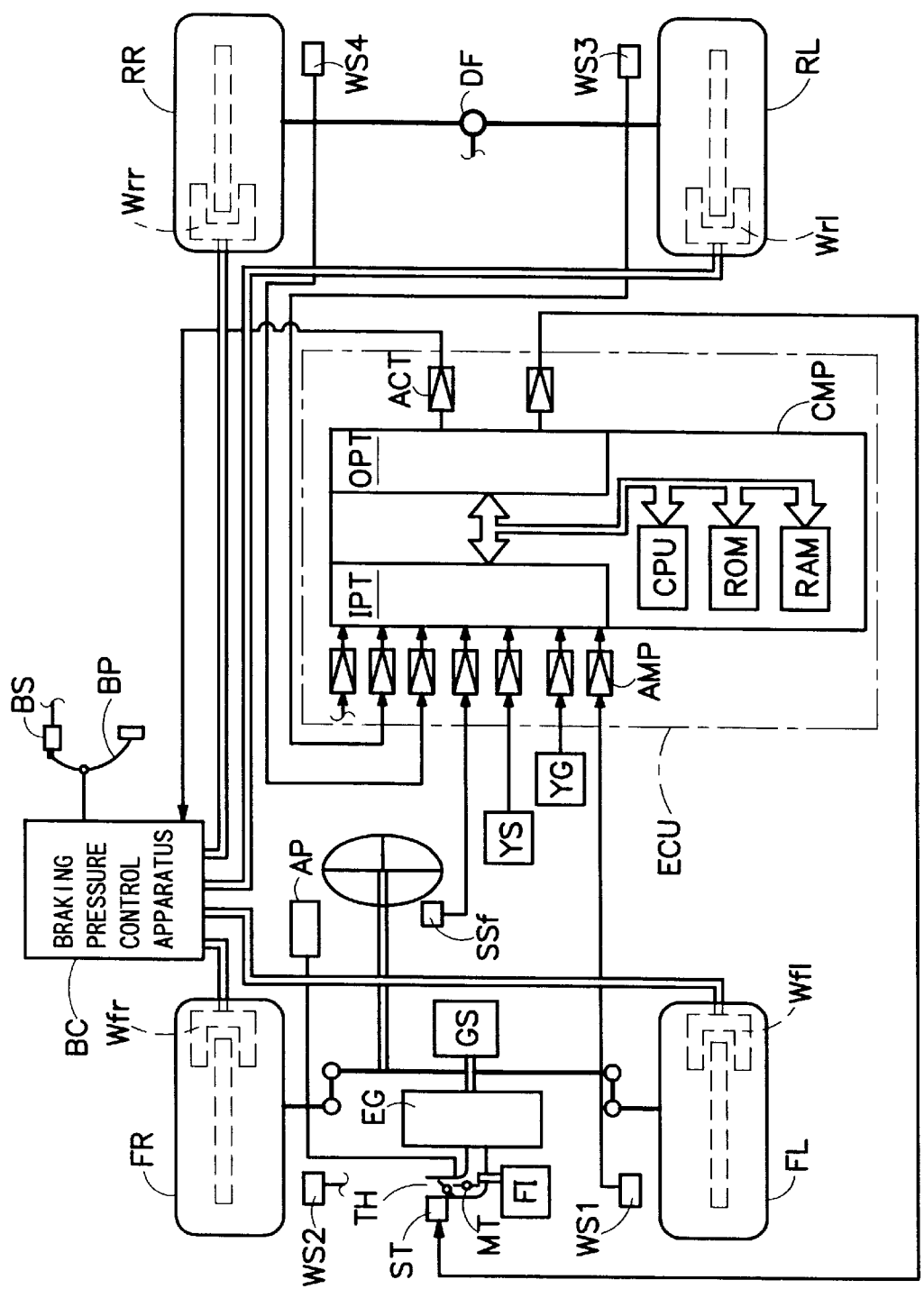
FIG. 2 is a schematic block diagram of a vehicle including the brake control system of an embodiment of the present invention.

More specifically, the details of the embodiment disclosed in FIG. 1 are illustrated in FIGS. 2 to 14. As shown in FIG. 2, the vehicle has an engine EG provided with a fuel injection apparatus FI and a throttle control apparatus TH which is arranged to control a main throttle opening of a main throttle valve MT in response to operation of an accelerator valve AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the rear wheels RL, RR through a transmission GS and a differential gear DF to provide a rear-drive system, but the present embodiment is not limited to the rear drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

Figure 3:
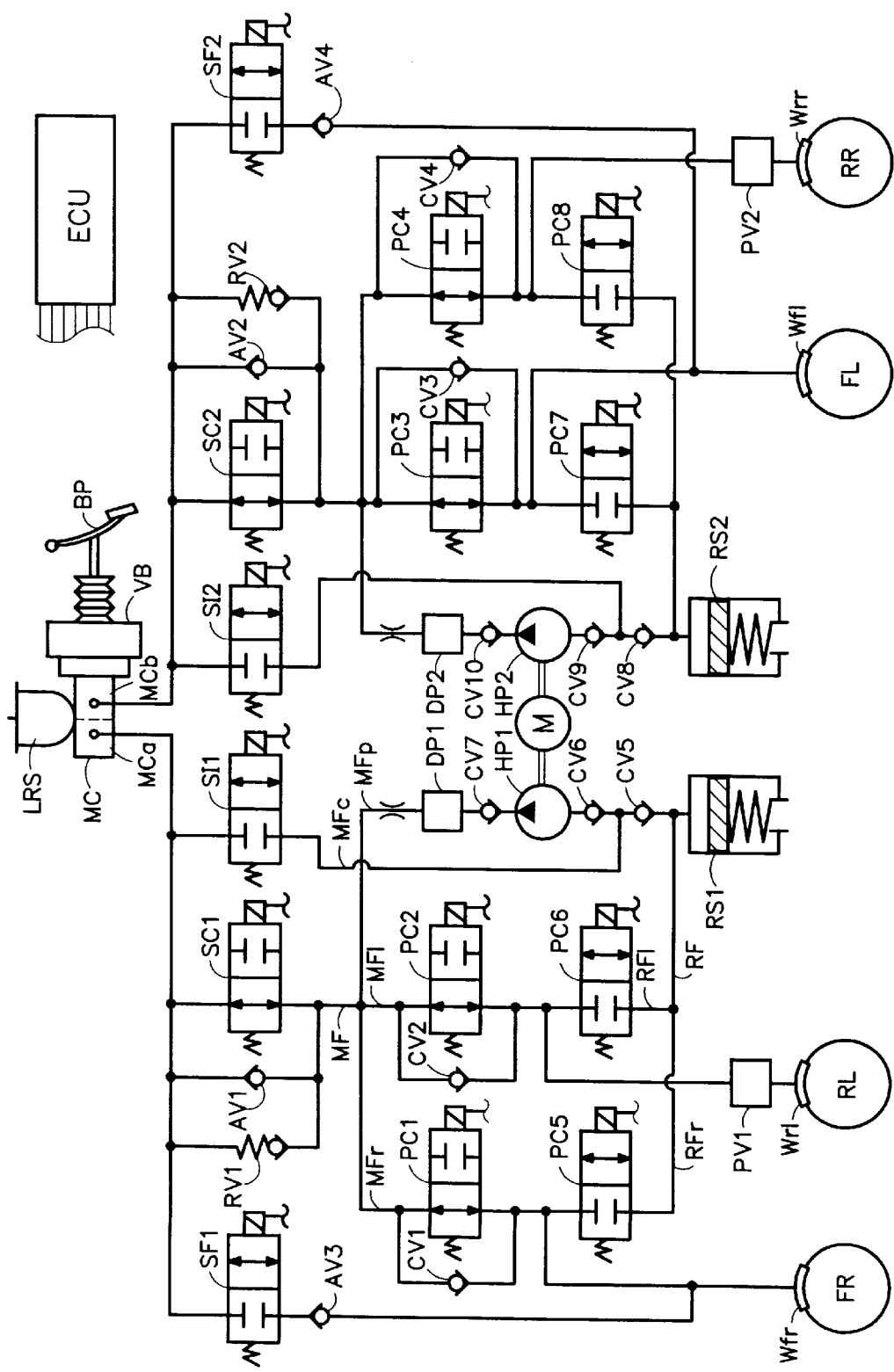
FIG. 3 is a block diagram illustrating an embodiment of a hydraulic braking pressure control apparatus for use in an embodiment of the present invention.

With respect to a braking system according to the present embodiment, wheel brake cylinders Wfl, Wfr, Wrl, Wrr are operatively mounted on the front wheels FL, FR and rear wheels RL, RR of the vehicle, respectively, and which is fluidly connected to a hydraulic braking pressure control apparatus BC. The pressure control apparatus BC in the present embodiment may be arranged as illustrated in FIG. 3 which will be explained later in detail. According to the present embodiment, a so-called diagonal circuit system has been employed, but a front-rear circuit system may be employed.

As shown in FIG. 2, at the wheels FL, FR, RL and RR, there are provided wheel speed sensors WS1 to WS4 respectively, which are connected to an electronic controller ECU, and by which a signal having pulses proportional to a rotational speed of each wheel, i.e., a wheel speed signal is fed to the electronic controller ECU. There are also provided a brake switch BS which turns on when the brake pedal BP is depressed, and turns off when the brake pedal BP is released, a front steering angle sensor SSf for detecting a steering angle $\delta f$ of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS, a varying rate of rotational angle of the vehicle about a normal on the center of gravity of the vehicle, i.e., a yaw angular velocity or yaw rate $\gamma$ is detected and fed to the electronic controller ECU. The yaw rate $\gamma$ may be calculated on the basis of a wheel speed difference vfd between the wheel speeds of non-driven wheels (wheel speeds Vwfl, Vwfr of the front wheels FL, FR in the present embodiment), i.e., Vfd=Vwfr−Vwfl, so that the yaw rate sensor YS may be omitted. Furthermore, between the wheels RL and RR may be provided a steering angle control apparatus (not shown), which enables a motor (not shown) to control a steering angle of the wheels RL, RR in response to the output of the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to wS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts shown in FIGS. 4 to 9, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

FIG. 3 shows the hydraulic braking pressure control apparatus BC according to the present embodiment, which includes a master cylinder MC and a vacuum booster VB which are activated in response to depression of the brake pedal BP. The master cylinder MC is boosted by the vacuum booster VB to pressurize the brake fluid in a low-pressure reservoir LRS and discharge the master cylinder pressure to the hydraulic braking pressure circuits for the wheels FR, RL and the wheels FL, RR, respectively. The master cylinder MC is of a tandem type having two pressure chambers communicated with two hydraulic braking pressure circuits, respectively. That is, a first pressure chamber MCa is communicated with the hydraulic braking pressure circuit for the wheels FR, RL, and a second pressure chamber MCb is communicated with the hydraulic braking pressure circuit for the wheels FL, RR.

In the hydraulic braking pressure circuit for the wheels FR, RL, the first pressure chamber MCa is communicated with wheel brake cylinders Wfr, Wrl respectively, through a main passage MF and its branch passages MFr, MFl. A normally open first solenoid valve SC1 (hereinafter, simply referred to a solenoid valve SC1) is disposed in the main passage MF, to act as a so-called cut-off valve. Also, the first pressure chamber MCa is communicated through an auxiliary passage MFc with check valves CV5, CV6, which will be described later. A normally closed second solenoid valve SI1 (hereinafter, simply referred to a solenoid valve SI1) is disposed in the auxiliary passage MFc. Each of the solenoid valves SC1, SI1 is formed by a two-port two-position solenoid operated valve. And, normally open two-port two-position solenoid operated switching valves PC1, PC2 (hereinafter, simply referred to as solenoid valves PC1, PC2) are disposed in the branch passages MFr, MFl, respectively, and in parallel therewith check valves CV1, CV2, respectively.

The check valve CV1, CV2 are provided for allowing the flow of the brake fluid toward the master cylinder MC and preventing the flow toward the wheel brake cylinders Wfr, Wrl. The brake fluid in the wheel brake cylinders Wfr, Wrl is returned to the master cylinder MC, and then to the low-pressure reservoir LRS through the check valves CV1, CV2 and the solenoid valve SC1 placed in its open position as shown in FIG. 3. Accordingly, if the brake pedal BP is released, the braking pressure in the wheel brake cylinders Wfr, Wrl is rapidly reduced to the pressure lower than the pressure at the master cylinder MC. And, normally closed two-port two-position solenoid operated switching valves PC5, PC6 (hereinafter, simply referred to as solenoid valves PC5, PC6) are disposed in the branch passages RFr, RFl, respectively, which merge into the drain passage RF connected to the reservoir RS1.

In the hydraulic braking pressure circuit for the wheels FR, RL, the solenoid valves PC1, PC2, PC5, PC6 form the modulator of the present invention. A hydraulic pressure pump HP1 is disposed in a passage MFp connected to the branch passages MFr, MFl at the upstream of the solenoid valves PC1, PC2, and an outlet of the pressure pump HP1 is connected to the solenoid valves PC1, PC2 through a check valve CV7. The pressure pump HP1 and a pressure pump HP2 are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and spring to function as an accumulator for storing a necessary volume of the brake fluid for various controls as described later.

The master cylinder MC is connected to a position between the check valves CV5 and CV6 disposed at the inlet side of the pressure pump HP1 through the passage MFc. The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 to a predetermined direction, and normally formed within the pressure pump HP1 in a body. Accordingly, the solenoid valve SI1 is normally placed in the closed position as shown in FIG. 3 where the communication between the master cylinder MC and the inlet of the pressure pump HP1 is blocked, and switched to the open position where the master cylinder MC is communicated with the inlet of the pressure pump HP1.

In parallel with the solenoid valve SC1, is disposed a relief valve RV1 which prevents the brake fluid in the master cylinder MC from flowing toward the solenoid valves PC1, PC2, and allows the brake fluid to flow toward the master cylinder MC when the braking pressure at the solenoid valves PC1, PC2 is more than the braking pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized braking pressure discharged from the pressure pump HP1 is more than the braking pressure discharged from the master cylinder MC by the predetermined pressure difference, thereby to modulate the brake fluid discharged from the pressure pump HP1 into a predetermined pressure. A damper DP1 is disposed at the outlet side of the pressure pump HP1, and a proportioning valve PV1 is disposed in a passage connected to the rear wheel brake cylinder Wrl. Between the master cylinder MC and the front wheel brake cylinder Wfr, are disposed a normally closed two-port two-position solenoid operated switching valve SF1 and a check valve AV3, so that the braking force can be applied to the front wheels when the brake pedal BP is depressed during the automatic pressurizing operation of the wheel brake cylinder Wfr.

In the hydraulic braking pressure circuit for the wheels FL, RR, are disposed a reservoir RS2, damper DP2, proportioning valve PV2, normally open two-port two-position solenoid operated switching valve SC2 (first switching valve), normally closed two-port two-position solenoid operated switching valves SI2 (second switching valve), SF2, PC7, PC8, normally open two-port two-position solenoid operated switching valves PC3, PC4, check valves CV3, CV4, CV8–CV10, relief valve RV2, and check valves AV2, AV4. The pressure pump HP2 is driven by the electric motor M together with the pressure pump HP1, both of the pumps HP1 and HP2 will be driven continuously after the motor M starts to operate them. The solenoid valves or the like provided for the two hydraulic pressure circuits will be represented by the one indicated by "*" in the following flowcharts.

In operation, all valves are placed in their normal positions and the motor M is stopped as shown in FIG. 3, during the normal braking operation. When the brake pedal BP is depressed in the conditions as shown in FIG. 3, the master cylinder MC is actuated to discharge the master cylinder pressure from the first and second pressure chambers MCa, MCb to the hydraulic braking pressure circuit for the wheels FR, RL, and the hydraulic braking pressure circuit for the wheels FL, RR, respectively, and supply the pressure into the wheel brake cylinders Wfr, Wrl, Wfl, Wrr, through the solenoid valves SC1, SC2 and the solenoid valves PC1–PC8. Since the hydraulic braking pressure circuits for the wheels FR, RL and wheels FL, RR are substantially the same, only the hydraulic braking pressure circuit for the wheels FR, RL will be explained hereinafter.

During the braking operation, when the wheel FR tends to be locked for example, and the anti-skid control is initiated, the solenoid valve PC1 is changed to its closed position, and the solenoid valve PC5 is placed in its open position, while the solenoid valve SC1 is placed in its open position. As a result, the brake fluid in the wheel brake cylinder Wfr is drained into the reservoir RS1 through the solenoid valve PC5 to reduce the pressure in the wheel brake cylinder Wfr. When a pulse pressure increase mode is selected for the wheel brake cylinder Wfr, the solenoid valve PC5 is placed in its closed position and the solenoid valve PC1 is placed in its open position, so that the master cylinder pressure is supplied from the master cylinder MC to the wheel brake cylinder Wfr through the solenoid valve PC1 in its open position. Then, the solenoid valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the solenoid valves PC2, PC5 are placed in the closed positions, and then the solenoid valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the solenoid valve SC1 in its open position, and consequently to the low pressure reservoir LRS. Thus, an independent braking force control is performed with respect to each wheel.

When the traction control is initiated to start an anti-slip control operation for the wheel RL under the accelerating operation, for example, the solenoid valve SC1 is changed to its closed position, and the solenoid valve SI1 is changed to its open position, and also the solenoid valve PC1 connected to the wheel brake cylinder Wfr is placed in its closed position, and the solenoid valve PC2 is placed in its open position. In this condition, if the pressure pump HP1 is driven by the motor M, the brake fluid is suctioned from the low pressure reservoir LRS through the master cylinder MC in its inoperative condition and the solenoid valve SI1 in its open position, the pressurized brake fluid will be supplied to the wheel brake cylinder Wrl for the driven wheel RL. Then, if the solenoid valve PC2 is placed in its closed position, the pressure in the wheel brake cylinder Wfr is held. Accordingly, even if the brake pedal BP is not depressed, when the acceleration slip control is made with respect to the wheel RL, for example, the solenoid valves PC2, PC6 are energized and de-energized alternately in response to the acceleration slip of the wheel RL to provide a pressure control mode out of the pulse pressure increase, pulse pressure decrease and hold modes for the wheel brake cylinder Wrl. Whereby, the braking force is applied to the wheel RL to limit its rotating force, so that the accelerating slip is effectively prevented to perform the traction control properly.

Furthermore, when the excessive oversteer, for example, is needed to be prevented in case of a steering control by braking, the moment for overcoming the excessive oversteer must be created. In this case, it is effective to apply the braking force only to a certain single wheel. That is, with respect to the hydraulic braking pressure circuit for the wheels FR, RL, the solenoid valve SC1 is placed in its closed position, and the solenoid valve SI1 is placed in its open position, and the motor M is driven, so that the pressure pump HP1 is actuated to discharge the pressurized brake fluid therefrom. Then, with the solenoid valves PC1, PC2, PC5, PC6 energized and de-energized alternately, the hydraulic pressure in each of the wheel braking cylinders Wfr, Wrl is gradually increased, decreased or held. Consequently, the braking force distribution between the front and rear wheels is controlled to keep the course trace performance of the vehicle.

The solenoid valves SC1, SC2, SI1, SI2 and solenoid valves PC1-PC8 are controlled by the electronic controller ECU to perform the anti-skid control, the steering control by braking, and etc. For example, when it is determined that the excessive oversteer occurs during cornering, a braking force will be applied to a front wheel located on the outside of the curve in the vehicle's path for example, to produce a moment for forcing the vehicle to turn in the direction toward the outside of the curve, i.e., an outwardly oriented moment, in accordance with an oversteer restraining control which may be called as a vehicle stability control. When it is determined that the excessive understeer occurs while a vehicle is undergoing a cornering maneuver, for example, the braking force will be applied to a front wheel located on the outside of the curve and applied to both of the rear wheels to produce a moment for forcing the vehicle to turn in the direction toward the inside of the curve, i.e., an inwardly oriented moment, in accordance with an understeer restraining control, which may be called as a course trace performance control. The above described oversteer restraining control and understeer restraining control as a whole may be called as the steering control by braking.

Figure 4:
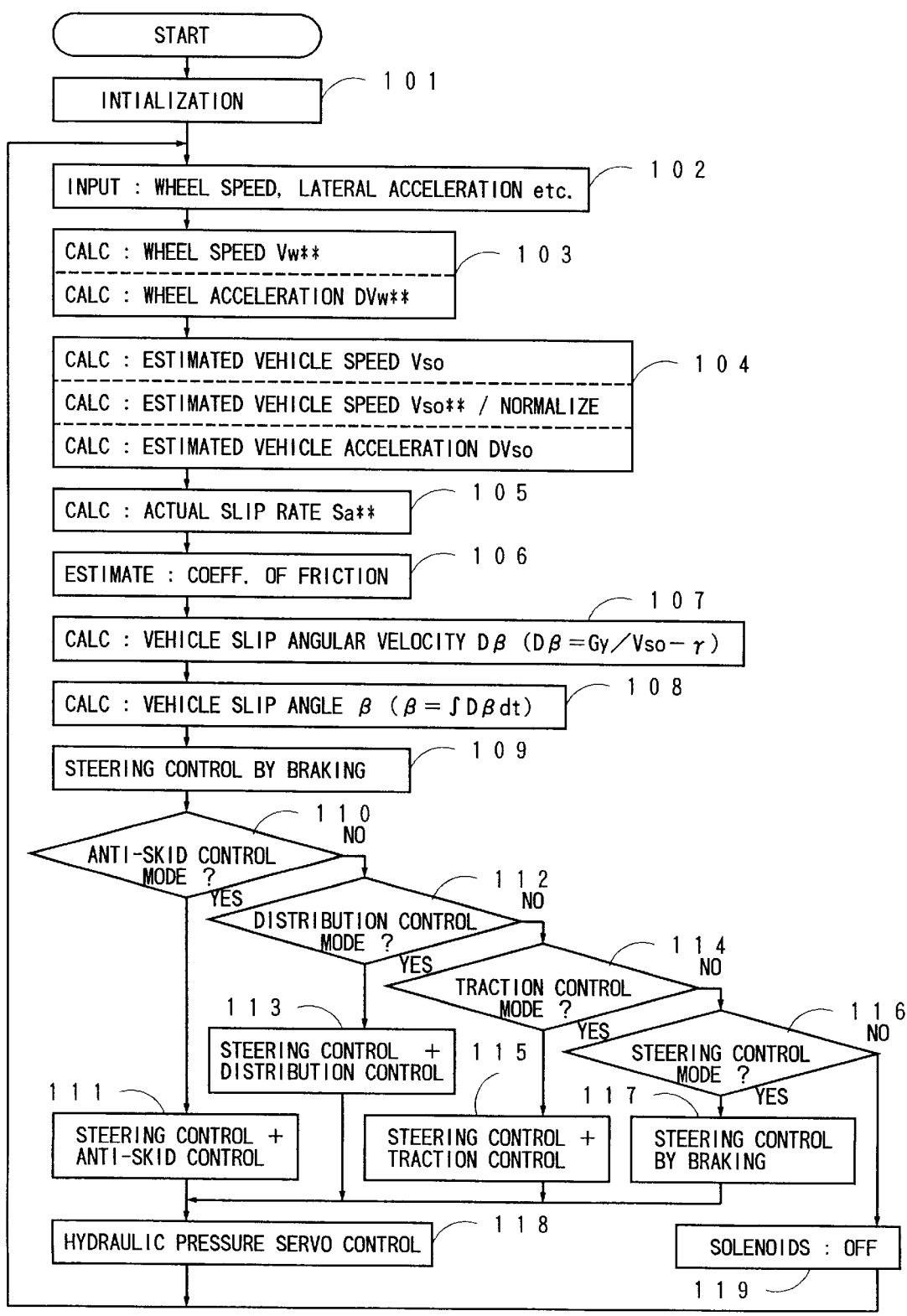
FIG. 4 is a flowchart showing a main routine of the brake control according to an embodiment of the present invention.

According to the present embodiment as constituted above, a program routine for the vehicle motion control including the steering control by braking, anti-skid control and so on is executed by the electronic controller ECU, as will be described hereinafter with reference to FIGS. 4 to 9. The program routine starts when an ignition switch (not shown) is turned on. At the outset, the program for the brake motion control as shown in FIG. 4 provides for initialization of the system at Step 101 to clear various data. At Step 102, the signals detected by the wheel speed sensors WS1 to WS4 are read by the electronic controller ECU, and also read are the signal (steering angle $\delta f$) detected by the front steering angle sensor SSf, the signal (actual yaw rate $\gamma$) detected by the yaw rate sensor YS, and the signal (actual lateral acceleration Gya) detected by the lateral acceleration sensor YG.

Then, the program proceeds to Step 103 where the wheel speed Vw ( represents one of the wheels FL, FR, RL, RR) of each wheel is calculated, and differentiated to provide the wheel acceleration DVw. The maximum of the wheel speeds Vw for four wheels is calculated to provide an estimated vehicle speed Vso on a gravity center of the vehicle (Vso=MAX[Vw]), an estimated vehicle speed Vso is calculated for each wheel, respectively, on the basis of the wheel speed Vw at Step 104. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration DVso. At Step 105, also calculated is an actual slip rate Sa on the basis of the wheel speed Vw for each wheel and the estimated vehicle speed Vso (or, the estimated and normalized vehicle speed NVso) which are calculated at Steps 103 and 104, respectively, in accordance with the following equation:

$$Sa^{}=(Vso^{}-Vw^{})/VSO^{}$$

Then, at Step 106, on the basis of the vehicle acceleration DVso and the actual lateral acceleration Gya detected by the lateral acceleration sensor YG, the coefficient of friction $\mu$ against a road surface can be calculated in accordance with the following equation:

$$\mu = (DVso^2 + Gya^2)^{1/2}$$

In order to detect the coefficient of friction against the road surface, various methods may be employed other than the above method, such as a sensor for directly detecting the coefficient of friction against the road surface, for example.

The program proceeds to Step 107, a vehicle slip angular velocity $D\beta$ is calculated, and a vehicle slip angle $\beta$ is calculated at Step 108. This vehicle slip angle $\beta$ is an angle which corresponds to a vehicle slip against the vehicle's path of travel, and which can be estimated as follows. That is, at the outset, the vehicle slip angular velocity $D\beta$, which is a differentiated value $d\beta/dt$ of the vehicle slip angle $\beta$, is calculated at Step 107 in accordance with the following equation:

$$D\beta = Gy/Vso - \gamma$$

Then, the vehicle slip angle $\beta$ is calculated at Step 108 in accordance with the following equation:

$$\beta = \int (Gy/Vso - \gamma)dt$$

where "Gy" is the lateral acceleration of the vehicle, "Vso" is the estimated vehicle speed of the vehicle measured at its gravity center, and "$\gamma$" is the yaw rate. The vehicle slip angle $\beta$ may be calculated in accordance with the following equation:

$$\beta = \tan^{-1}(Vy/Vx)$$

where "Vx" is a longitudinal vehicle speed, and "Vy" is a lateral vehicle speed.

Then, the program proceeds to Step 109 where a mode for steering control by braking is made to provide a desired slip rate for use in the steering control by braking, wherein the braking force applied to each wheel is controlled at Step 117 through the hydraulic pressure servo control which will be explained later, so that the pressure control apparatus BC is controlled in response to the condition of the vehicle in motion. The steering control by braking is to be added to each control performed in all the control modes described later. The specific initial control may be performed before the steering control by braking starts, and also may be performed before the traction control starts, but it shall be terminated immediately after the anti-skid control starts. Then, the program proceeds to Step 110, where it is determined whether the condition for initiating the anti-skid control is fulfilled or not. If it is determined that the condition is in the anti-skid control mode, the specific initial control is terminated immediately at Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 102. If it is determined at Step 116 that the condition for initiating the steering control by braking has not been fulfilled, the program proceeds to Step 119 where solenoids for all of the solenoid valves are turned off, and then the program returns to Step 102. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

According to the above-described anti-skid control mode, the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to control a driving force to the driven wheel.

Figure 5:
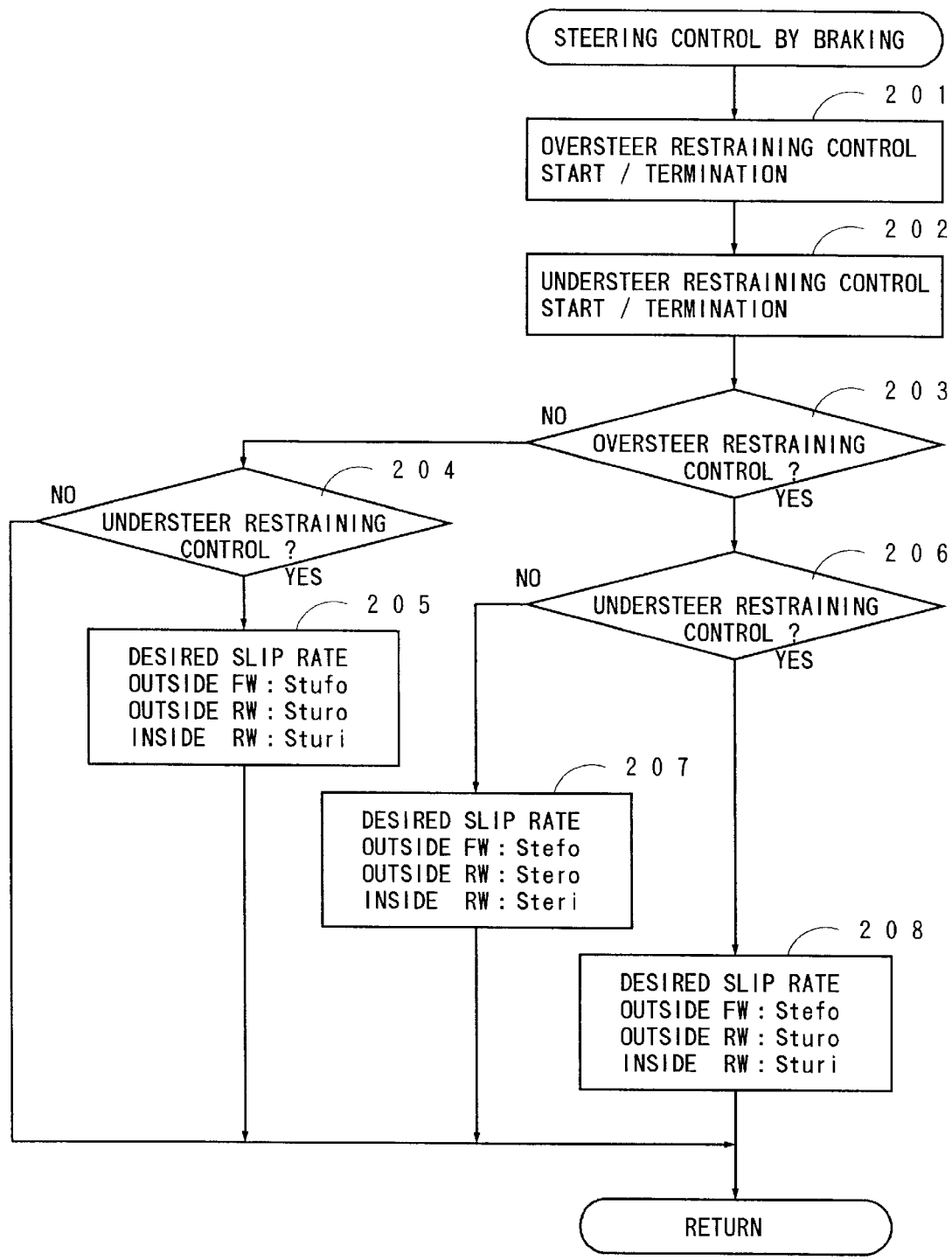
FIG. 5 is a flowchart showing a sub-routine for setting a desired slip rate for use in a steering control by braking according to an embodiment of the present invention.
Figure 10:
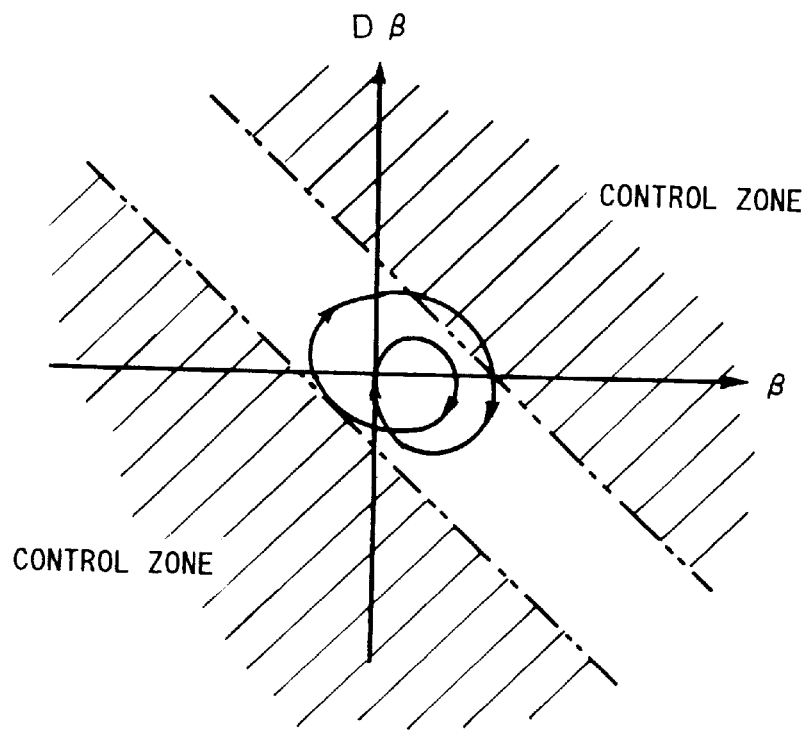
FIG. 10 is a diagram showing a region for determining start and termination of the oversteer restraining control according to an embodiment of the present invention.

FIG. 5 shows a flowchart for setting desired slip rates which are to be provided at Step 109 in FIG. 4 for the operation of the steering control by braking, which includes the oversteer restraining control and the understeer restraining control. Through this flowchart, therefore, the desired slip rates are set in accordance with the oversteer restraining control and/or the understeer restraining control. At the outset, it is determined at Step 201 whether the oversteer restraining control is to be started or terminated, and also determined at Step 202 whether the understeer restraining control is to be started or terminated. More specifically, the determination is made at Step 201 on the basis of the determination whether it is within a control zone indicated by hatching on a $\beta$–$D\beta$ plane as shown in FIG. 10. That is, if the vehicle slip angle $\beta$ and the vehicle slip angular velocity $D\beta$ which are calculated when determining the start or termination, are fallen within the control zone, the oversteer restraining control will be started. However, if the vehicle slip angle $\beta$ and the vehicle slip angular velocity $D\beta$ come to be out of the control zone, the oversteer restraining control will be controlled as indicated by the arrow in FIG. 10 thereby to be terminated. Therefore, the boundary between the control zone and non-control zone (as indicted by two dotted chain line in FIG. 10) corresponds to the boundary of a starting zone. And, the braking force applied to each wheel is controlled in such a manner that the farther they remote from the boundary between the control zone and non-control zone (two dotted chain line in FIG. 10) toward the control zone, the more the amount to be controlled will be provided.

Figure 11:
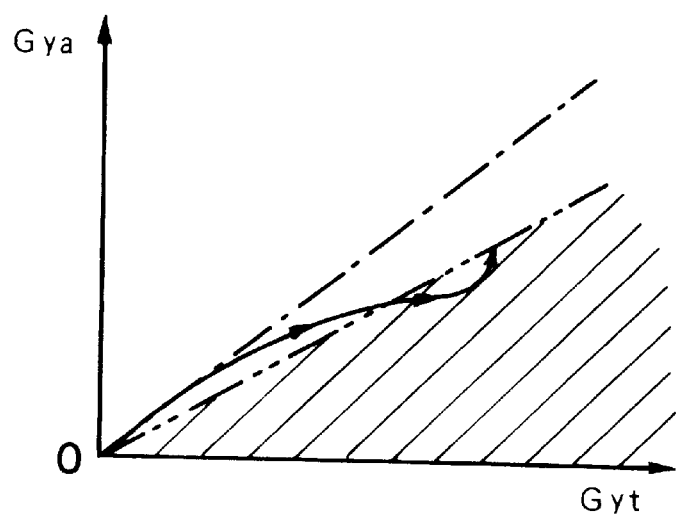
FIG. 11 is a diagram showing a region for determining start and termination of the understeer restraining control according to an embodiment of the present invention.

On the other hand, the determination of the start and termination is made at Step 202 on the basis of the determination whether it is within a control zone indicated by hatching in FIG. 11. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 11 thereby to be terminated.

Then, the program proceeds to Step 203, where it is determined whether the oversteer restraining control is to be performed or not. If the oversteer restraining control is not to be performed, the program further proceeds to Step 204 where it is determined whether the understeer restraining control is to be performed or not. In the case where the understeer restraining control is not to be performed, the program returns to the main routine. In the case where it is determined at Step 204 that the understeer restraining control is to be performed, the program proceeds to Step 205 where the desired slip rate of each wheel is set to a desired slip rate which is provided for use in the understeer restraining control. If it is determined at Step 203 that the oversteer restraining control is to be performed, the program proceeds to Step 206 where it is determined whether the understeer restraining control is to be performed or not. In the case where the understeer restraining control is not to be performed, the program proceeds to Step 207 where the desired slip rate of each wheel is set to a desired slip rate which is provided for use in the oversteer restraining control. In the case where it is determined at Step 206 that the understeer restraining control is to be performed, the program proceeds to Step 208 where the desired slip rate of each wheel is set to a desired slip rate which is provided for use in both of the oversteer restraining control and the understeer restraining control.

With respect to the desired slip rate for use in the oversteer restraining control set at Step 207, the vehicle slip angle $\beta$ and the vehicle slip angular velocity $D\beta$ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt=\gamma(\theta f)\cdot Vso;$$

$$\gamma(\theta f)=\{\theta f/(N\cdot L)\}\cdot Vso/(1+Kh\cdot Vso^2)$$

where "Kh" is a stability factor, "N" is a steering gear ratio, and "L" is a wheelbase of the vehicle.

At Step 205, the desired slip rate of a front wheel located on the outside of the curve of the vehicle's path is set as "Stufo", the desired slip rate of a rear wheel located on the outside of the curve is set as "Sturo", and the desired slip rate of a wheel located on the inside of the curve is set as "Sturi". As for the slip rate, "t" indicates a desired value, which is comparable with a measured actual value indicated by "a". Then, "u" indicates the understeer restraining control, "r" indicates the rear wheel, "o" indicates the outside of the curve, and "i" indicates the inside of the curve, respectively. At Step 207, the desired slip rate of the front wheel located on the outside of the curve is set as "Stefo", the desired slip rate of the rear wheel located on the outside of the curve is set as "Stero", and the desired slip rate of the rear wheel located on the inside of the curve is set as "Steri", wherein "e" indicates the oversteer restraining control.

Whereas, at Step 208, the desired slip rate of the front wheel located on the outside of the curve is set as "Stefo", the desired slip rate of the rear wheel located on the outside of the curve is set as "Sturo", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a front wheel located on the inside of the curve, i.e., a non-driven wheel of a rear drive vehicle is not to be controlled, because this wheel is employed as a reference wheel for use in calculation of the estimated vehicle speed.

The desired slip rates Stefo, Stero and Steri for use in the oversteer restraining control are calculated in accordance with the following equations, respectively:

$$Stefo=K1\cdot\beta+K2\cdot D\beta$$

$$Stero=K3\cdot\beta+K4\cdot D\beta$$

$$Steri=K5\cdot\beta+K6\cdot D\beta$$

where K1 to K6 are constants which are set so as to provide the desired slip rates Stefo, Stero which are used for increasing the braking pressure (i.e., increasing the braking force), and the desired slip rate Steri which is used for decreasing the braking pressure (i.e., decreasing the braking force).

On the contrary, the desired slip rates Stufo, Sturo and Sturi for use in the understeer restraining control are calculated in accordance with the following equations, respectively:

$$Stefo=K7\cdot\Delta Gy$$

$$Sturo=K8\cdot\Delta Gy$$

$$Sturi=K9\cdot\Delta Gy$$

where K7 is a constant for providing the desired slip rate Stufo which is used for increasing the braking pressure (or, alternatively decreasing the braking pressure), while K8 and K9 are constants for providing the desired slip rates Sturo, Sturi both of which are used for increasing the braking pressure.

Figure 6:
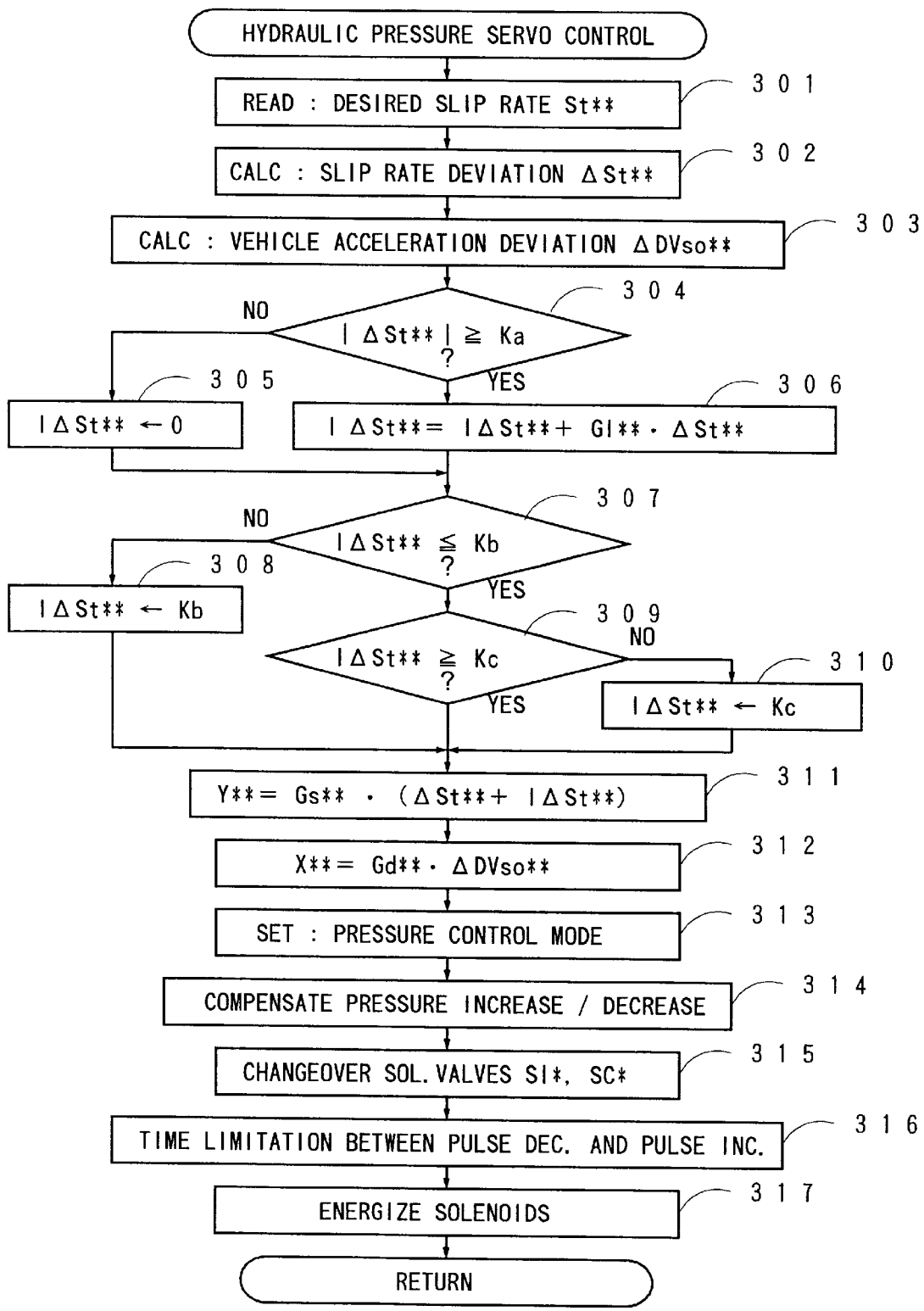
FIG. 6 is a flowchart showing a hydraulic pressure servo control according to an embodiment of the present invention.

FIG. 6 shows the hydraulic pressure servo control which is executed at Step 118 in FIG. 4, and wherein the wheel cylinder pressure for each wheel is controlled through the slip rate servo control. At Step 301, desired slip rates St, which are set at Step 205, 207, or 208, are read to provide the desired slip rate for each wheel of the vehicle. Then, the program proceeds to Step 302 where a slip rate deviation $\Delta$St is calculated for each wheel, and further proceeds to Step 303 where a vehicle acceleration deviation $\Delta$DVso is calculated. At Step 302, the difference between the desired slip rate St and the actual slip rate Sa is calculated to provide the slip rate deviation $\Delta$St (i.e., $\Delta$St=St−Sa). And, at Step 303, the difference between the estimated vehicle acceleration DVso on the center of gravity of the vehicle and the vehicle acceleration DVw of a wheel to be controlled is calculated to provide the vehicle acceleration deviation $\Delta$DVso. The actual slip rate Sa and the vehicle acceleration deviation $\Delta$DVso** may be calculated in accordance with a specific manner which is determined in dependence upon the control modes such as the anti-skid control mode, traction control mode, or the like.

Then, the program proceeds to Step 304 where the slip rate deviation $\Delta St^{}$ is compared with a predetermined value Ka. If an absolute value of the slip rate deviation $|\Delta St^{}|$ is equal to or greater than the predetermined value Ka, the program proceeds to Step 306 where an integrated value ($I\Delta St^{}$) of the slip rate deviation $\Delta St^{}$ is renewed. That is, a value of the slip rate deviation $\Delta St^{}$ multiplied by a gain $GI^{}$ is added to the integrated value of the slip rate deviation $I\Delta St^{}$ obtained at the previous cycle of this routine to provide the integrated value of the slip rate deviation $I\Delta St^{}$ at the present cycle. If the absolute value of the slip rate deviation $|\Delta St^{}|$ is smaller than the predetermined value Ka, the program proceeds to Step 305 where the integrated value of the slip rate deviation $I\Delta St^{}$ is cleared to be zero (0). Then, the program proceeds to Steps 307–310, where the integrated value of the slip rate deviation $I\Delta St^{}$ is limited to a value which is equal to or smaller than an upper limit value Kb, and which is equal to or greater than a lower limit value Kc. If the integrated value of the slip rate deviation $I\Delta St^{}$ is greater than the upper limit Kb, it is set to be the value Kb, whereas if the integrated value of the slip rate deviation $I\Delta St^{**}$ is smaller than the lower limit Kc, it is set to be the value Kc, and the program proceeds to Step 311.

Figure 12:
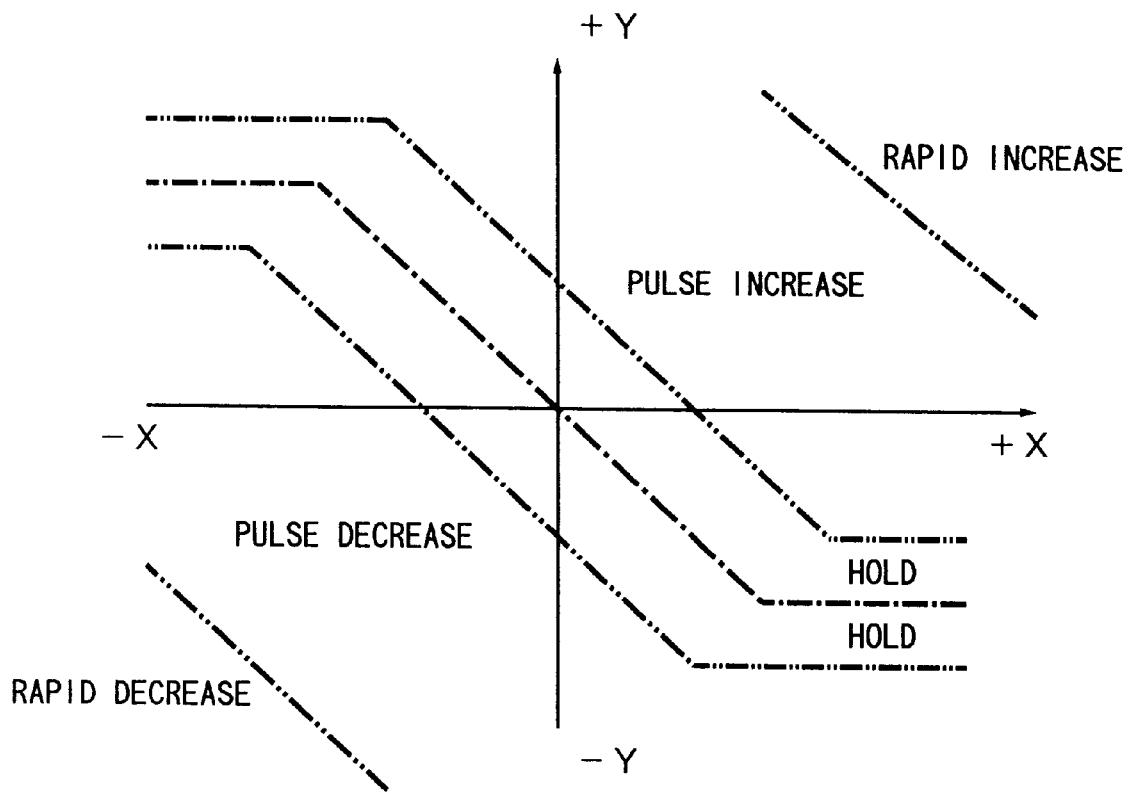
FIG. 12 is a diagram showing a relationship between the pressure control modes and parameters for use in the hydraulic braking pressure control according to an embodiment of the present invention.
Figure 13:
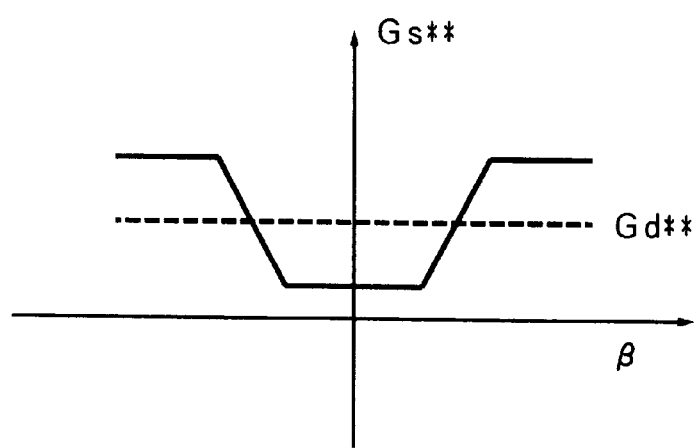
FIG. 13 is a diagram showing a relationship between a vehicle slip angle a nd a gain for calculating the parameters according to an embodiment of the present invention.

Thereafter, the program proceeds to Step 311 where a parameter $Y^{**}$ for providing a hydraulic pressure control in each control mode is calculated in accordance with the following equation:

$$Y^{}=Gs^{} \cdot (\Delta St^{}+I\Delta St^{})$$

where "$Gs^{}$" is a gain, which is provided in response to the vehicle slip angle $\beta$ and in accordance with a diagram as shown by a solid line in FIG. 13. The program further proceeds to Step 312 where another parameter $X^{}$ is calculated in accordance with the following equation:

$$X^{}=Gd^{} \cdot \Delta Vso^{**}$$

where "$Gd^{}$" is a gain which is a constant value as shown by a broken line in FIG. 13. On the basis of the parameters $X^{}$ and $Y^{}$, a pressure control mode for each wheel is provided at Step 313, in accordance with a control map as shown in FIG. 12. The control map has a rapid pressure decreasing zone, a pulse pressure decreasing zone, a pressure holding zone, a pulse pressure increasing zone, and a rapid pressure increasing zone which are provided in advance as shown in FIG. 12, so that any one of the zones is selected in accordance with the parameters $X^{}$ and $Y^{**}$ at Step 313. In the case where no control mode is performed, no pressure control mode is provided (i.e., solenoids are off).

At Step 314, is performed a pressure increase and decrease compensating control, which is required for smoothing the first transition and last transition of the hydraulic pressure, when the presently selected zone is changed from the previously selected zone at Step 313, e.g., from the pressure increasing zone to the pressure decreasing zone, or vice versa. When the zone is changed from the rapid pressure decreasing zone to the pulse pressure increasing zone, for instance, a rapid pressure increasing control is performed for a period which is determined on the basis of a period during which a rapid pressure decrease mode, which was provided immediately before the rapid pressure increasing control, lasted. Then, the program proceeds to Step 315, where the changeover process for the solenoid valves SI* (represents SI1 and SI2), and the solenoid valves SC* (represents SC1 and SC2), and proceeds to Step 316, where the process for limiting the time between the pulse pressure decrease and pulse pressure increase, which will be described later. And, the program proceeds to Step 317 where the solenoid of each valve in the hydraulic pressure control apparatus BC is energized or de-energized in accordance with the mode determined by the selected pressure control zone or the pressure increase and decrease compensating control thereby to control the braking force applied to each wheel.

According to the present embodiment, the steering control by braking is performed irrespective of depression of the brake pedal BP to provide the oversteer restraining control and/or the understeer restraining control. Although the slip rate is used for the control in the present embodiment, any value corresponding to the braking force applied to each wheel, such as the braking pressure in each wheel brake cylinder, may be employed as the desired value for the oversteer restraining control and/or the understeer restraining control.

Figure 7:
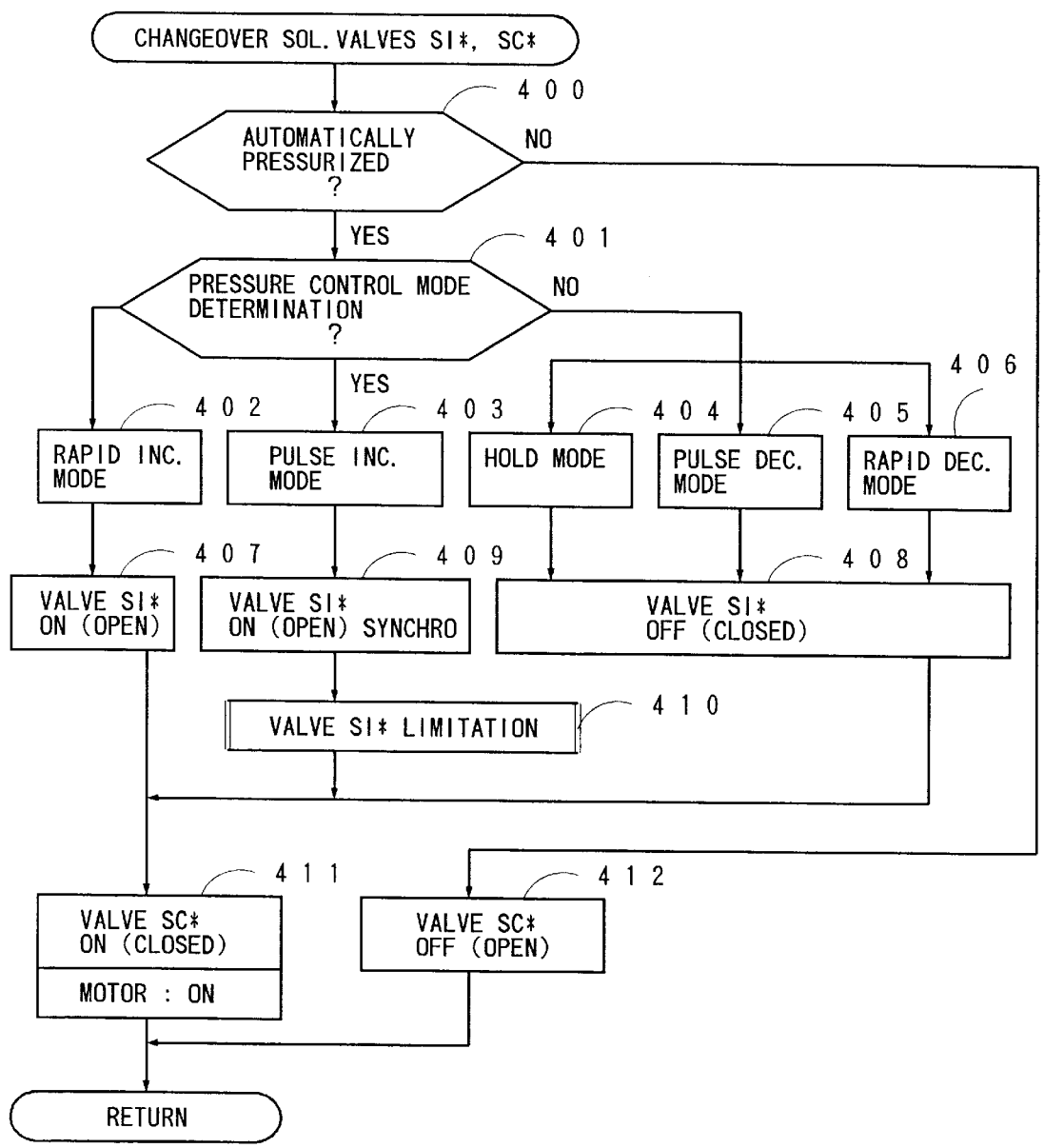
FIG. 7 is a flowchart showing a changeover control of solenoid valves SI*, SC* according to an embodiment of the present invention.

Next, the changeover process for the solenoid valves SI*, SC* executed at Step 315 will be explained with reference to FIGS. 7, 8. At the outset, it is determined whether an automatic pressurization is being performed or not, at Step 400. The automatic pressurization is to apply the braking pressure to the wheel brake cylinder by the pressurized brake fluid discharged from the pressure pump, irrespective of depression of the brake pedal, in case of the traction control, steering control by braking, or the like. Therefore, the automatic pressurization will not be performed in case of the anti-skid braking control without the steering control by braking included therein. In this case, the program proceeds to Step 412, where the solenoid valves SC* is turned off to be placed in its open position. When the automatic pressurization is to be performed, the program proceeds to Steps 401–410, then to Step 411, where the solenoid valves SC* is turned on to be placed in its closed position, and the motor M is turned on to actuate the pressure pump HP*.

Figure 14:
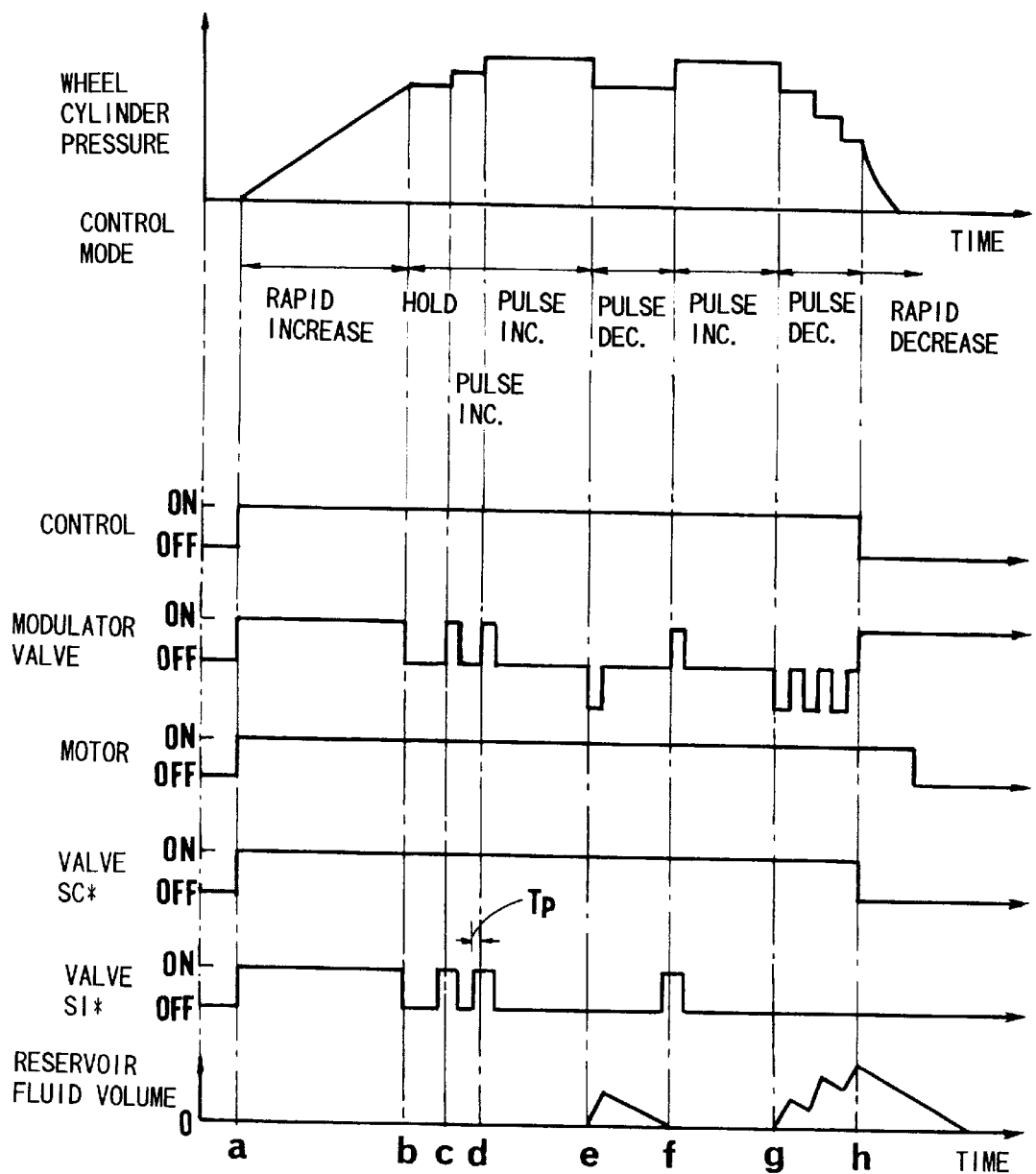
FIG. 14 is a diagram showing an example of operation of solenoid valves and an electric motor, and variation of a volume of the brake fluid stored in the reservoir and wheel cylinder pressure.

At Step 401, the pressure control mode set at Step 313 is determined to correspond to which of the rapid pressure increase mode, pulse pressure increase mode, pulse pressure decrease mode, rapid pressure decrease mode and hold mode, and the program proceeds to Steps 402–406 in accordance with the selected pressure control mode. When the rapid pressure increase mode is set, the program proceeds to Step 402, and then to Step 407, where the solenoid valve SI* is turned on to be placed in its open position. When the pulse pressure increase mode is set, the program proceeds to Step 403, and then to Step 409, where the solenoid valve SI* is turned on to be placed in its open position, prior to the pressure increasing timing of the pulse pressure increase mode for repeating the holding and increasing the pressure, by a predetermined period of time "Tp". Referring to FIG. 14, the solenoid valve SI* is opened in substantially synchronous relationship with the rapid pressure increase mode (a to b in FIG. 14), and pulse pressure increase mode (c, d, f in FIG. 14), while the solenoid valve SI* is opened prior to the pressure increasing timing of the pulse pressure increase mode, by the predetermined period of time "Tp", and placed in its open position until the pressure increasing of the pulse pressure increase mode is terminated. The period of time "Tp" is provided mainly for compensating a delay in discharging operation of the pressure pump HP*. Therefore, it is so arranged that the pressure pump HP* can discharge the pressurized brake fluid, before the solenoid valve (e.g. PC1) is placed in its closed position. The period of time "Tp" is set in response to the rotational speed of the pressure pump HP* (e.g., 20 ms for 3000 rpm). As for other factors in determining the period of time "Tp", there is a delay in operating the solenoid valve SI*, which may be ignored. In the pulse pressure increase mode, a limiting process for the solenoid valve SI* is made at Step 410 following Step 409, as will be described later with reference to FIG. 8.

In the case where the pressure control mode set at Step 313 is one of the hold mode, pulse pressure decrease mode and rapid pressure decrease mode, i.e., other than the rapid pressure increase mode and pulse pressure increase mode, the program proceeds from Step 401 to Steps 404, 405 and 406, and then to Step 408, where the solenoid valve SI* is turned off to be placed in its closed position. Thereafter, the program proceeds from Steps 407, 408 and 410 to Step 411, where the solenoid valve SC* is turned on to be placed in its closed position, and the motor M is turned on to drive the pressure pump HP*.

Figure 8:
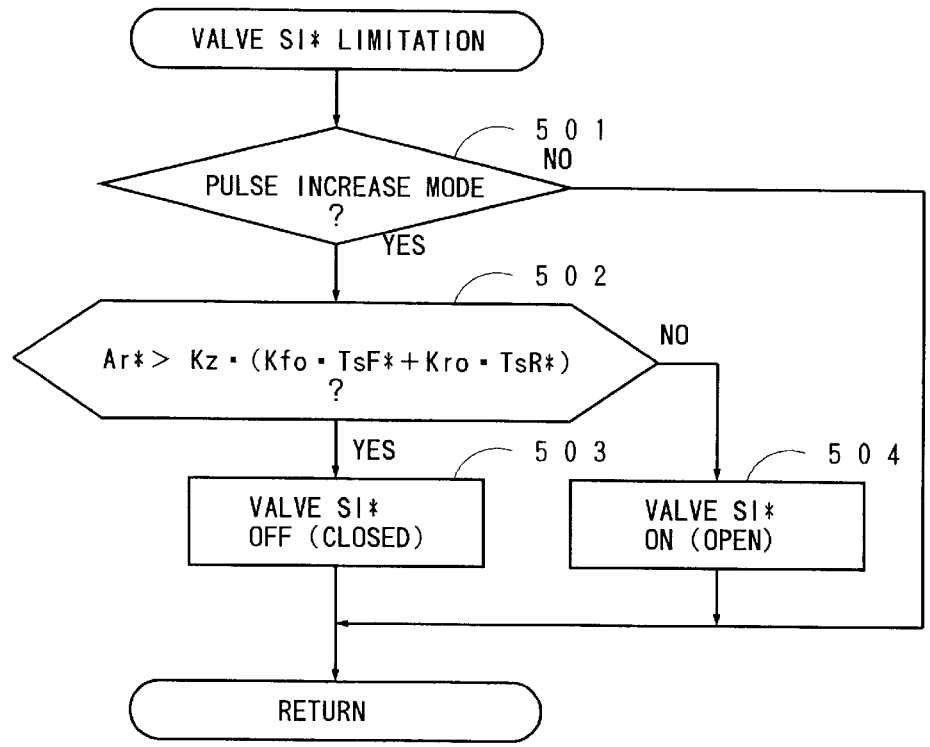
FIG. 8 is a flowchart showing a limiting process for the solenoid valve SI* according to an embodiment of the present invention.

FIG. 8 shows the limiting process for the solenoid valve SI*. At Step 501, it is determined whether the pressure control mode is the pulse pressure increase mode or not. If it is the pulse pressure increase mode, the program proceeds to Step 502, where a volume "Ar*" of the brake fluid remaining in the reservoir RS* is compared with a volume of the brake fluid required for the wheel brake cylinder communicated with the reservoir RS* at that time. If the volume "Ar*" of the brake fluid remaining in the reservoir RS* is greater than the volume of the brake fluid required for that wheel brake cylinder, the program proceeds to Step 503, where the solenoid valve SI* is turned off to be placed in its closed position. Otherwise, the program proceeds to Step 504, where the solenoid valve SI* is turned on to be placed in its open position. Thus, if the volume "Ar*" of the brake fluid remaining in the reservoir RS* is greater than the volume of the brake fluid required for that wheel brake cylinder even in case of the pulse pressure increase mode, the solenoid valve SI* is held to be placed in its closed position, so that the brake fluid stored in the reservoir can be drained appropriately by the pressure pump HP*.

The volume "Ar*" of the brake fluid remaining in the reservoir RS* can be obtained by adding (Kfd·ΣZ TdF*) and (Krd·ΣTdR*), and subtracting (Km·Mon) therefrom, as follows;

$$Ar^* = \{(Kfd \cdot \Sigma TdF^*) + (Krd \cdot \Sigma TdR^*) - (Km \cdot Mon)\}$$

where "Kfd", "Krd", "Km" are coefficients, and "ΣTdF*", "ΣTdR*" are pressure decreasing times for the front wheels and rear wheels, respectively. "Mon" is a period of time when the motor M is on, while the solenoid valve SI* is off. A reference volume of the brake fluid can be obtained by multiplying the sum of a volume of the brake fluid necessary for the front wheels (Kfo·TsF*) and a volume of the brake fluid necessary for the rear wheels (Kro·TsR*) by a constant margin "Kz" (e.g., 1.2), thereby to produce Kz·{(Kfo·TsF*)+(Kro·TsR*)} where "Kfo", "Kro" are coefficients, and TsF*, TsR* are periods of time for pressure increasing in the pulse pressure increase mode, which are varied in dependence upon the pressure control modes.

Figure 9:
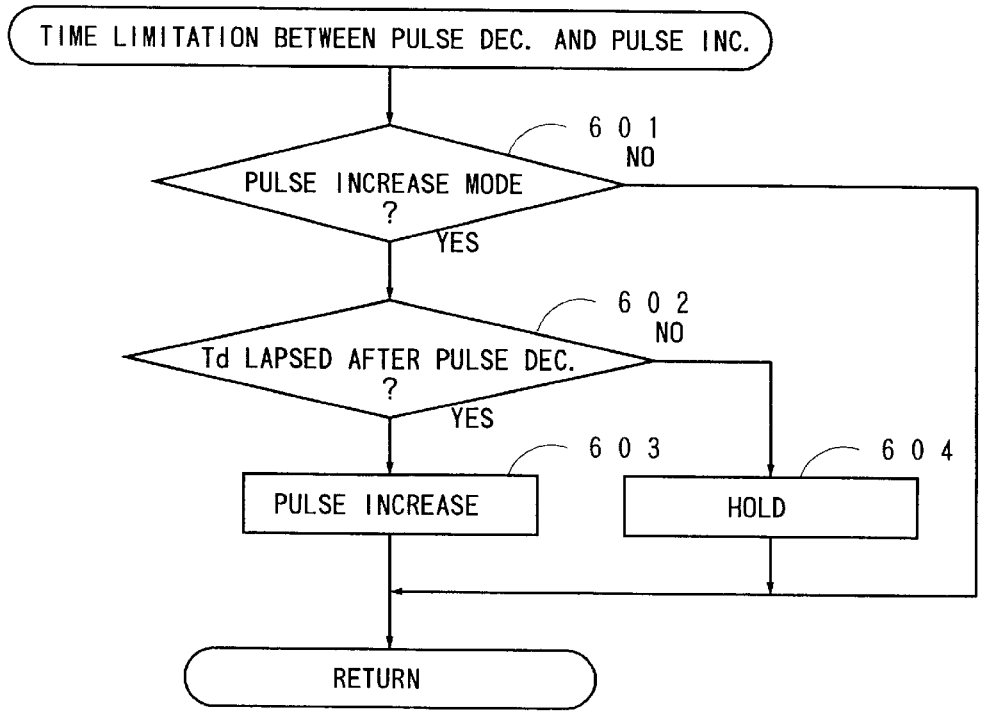
FIG. 9 is a flowchart showing a limiting process for a time between pulse pressure decrease and increase according to an embodiment of the present invention.

FIG. 9 shows the limiting process for the time between the pulse pressure decrease mode and the pulse pressure increase mode performed at Step 316 in FIG. 6. At Step 601, it is determined whether the pressure control mode is the pulse pressure increase mode, or not. If it is the pulse pressure increase mode, the program proceeds to Step 602, where it is further determined whether a predetermined period of time "Td" has elapsed after the pulse pressure decrease mode, or not. If the predetermined period of time "Td" has elapsed, the program proceeds to Step 603, where the pulse pressure increase mode is performed. Otherwise, the program proceeds to Step 604, where the hold mode is set, even if the pulse pressure increase mode was selected. In other words, repetition of increasing and decreasing the pressure for a short period of time will be avoided, and the braking pressure will be held without being increased for the predetermined period after the end of pulse pressure decrease mode, so that the solenoid valve SI* is held to be placed in its closed position. Accordingly, the process for limiting the time between the pulse pressure decrease mode and the pulse pressure increase mode can prevent the brake fluid from being stored in the reservoir RS* by the frequent repetition of the pulse pressure increase mode and pulse pressure decrease mode.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:
   a wheel brake cylinder operatively mounted on each wheel of said vehicle;
   a master cylinder for pressurizing brake fluid to supply braking pressure to said wheel brake cylinder in response to depression of a brake pedal;
   modulator means disposed between said master cylinder and said wheel brake cylinder for modulating the braking pressure in said wheel brake cylinder;
   pump means for introducing from an inlet thereof the brake fluid and pressurizing the brake fluid to supply the braking pressure to said wheel brake cylinder through said modulator means;
   a reservoir for storing the brake fluid drained from said wheel brake cylinder through said modulator means;
   first valve means for communicating said master cylinder with said modulator means, or blocking the communication between said master cylinder and said modulator means, said first valve means normally communicating said master cylinder with said modulator means;
   second valve means for communicating said master cylinder with the inlet of said pump means, or blocking the communication between said master cylinder and said pump means, said second valve means normally blocking the communication between said master cylinder and said pump means;
   a check valve disposed between a first position for connecting said modulator means with said reservoir and a second position for connecting said second valve means with the inlet of said pump means, said check valve allowing the brake fluid toward said pump means and preventing the reverse flow; and
   control means for controlling said modulator means, said pump means, said first valve means and said second valve means, said control means actuating said pump means to be driven continuously when said control means controlling said modulator means, and said control means actuating said second valve means to communicate said master cylinder with said pump means only when the braking pressure in said wheel brake cylinder is being increased by said modulator means.

2. A brake control system as set forth in claim 1, further comprising vehicle condition monitor means for monitoring a condition of said vehicle, wherein said control means is adapted to actuate said modulator means to modulate the braking pressure in at least one of said wheel brake cylinders operatively mounted on one of said wheels to control the braking force applied thereto, on the basis of the output of said monitor means and irrespective of depression of said brake pedal, and wherein said control means is adapted to actuate said second valve means to communicate said master cylinder with said pump means, when said control means actuates said modulator means to modulate the braking pressure on the basis of the output of said monitor means and irrespective of depression of said brake pedal, and only when the braking pressure in said wheel brake cylinder is being increased by said modulator means.

3. A brake control system as set forth in claim 1, further comprising a relief valve for allowing the brake fluid to flow from said modulator means to said master cylinder when the braking pressure in the downstream of said first valve means is more than the braking pressure discharged from said master cylinder by a predetermined pressure difference.

4. A brake control system as set forth in claim 1, wherein said control means is adapted to actuate said modulator means to modulate the braking pressure in said wheel brake cylinder in accordance with a pressure control mode selected from pressure control modes including a rapid pressure increase mode for increasing the braking pressure in one of said wheel brake cylinders by a relatively rapid rate comparing with the other pressure control modes, a pulse pressure increase mode for increasing the braking pressure intermittently, a pulse pressure decrease mode for decreasing the braking pressure intermittently, a rapid pressure decrease mode for decreasing the braking pressure by a relatively rapid rate comparing with the other pressure control modes, and a hold mode for holding the braking pressure.

5. A brake control system as set forth in claim 4, wherein said control means is adapted to actuate said second valve means to communicate said master cylinder with said pump means prior to the time when the pulse pressure increase mode is selected for the pressure control mode, by a predetermined period of time.

6. A brake control system as set forth in claim 5, wherein said predetermined period of time is set in accordance with the rotational speed of said pump means.

7. A brake control system as set forth in claim 4, wherein said control means is adapted to keep said second valve means blocking the communication between said master cylinder and said pump means until an estimated volume of the brake fluid stored in said reservoir is less than a predetermined volume, when the pulse pressure increase mode is selected for the pressure control mode.

8. A brake control system as set forth in claim 7, wherein said estimated volume of the brake fluid stored in said reservoir is calculated on the basis of a period of time when the braking pressure in said wheel brake cylinder has been decreased, and a period of time when said pump means has been driven, with said second valve means blocking the communication between said master cylinder and said pump means.

9. A brake control system as set forth in claim 4, wherein said control means is adapted to keep said second valve means blocking the communication between said master cylinder and said pump means, when the duration of the pulse pressure decrease mode is less than a predetermined period of time until the pulse pressure decrease mode is changed to the pulse pressure increase mode.

* * * * *